(12) United States Patent
Wang et al.

(10) Patent No.: US 8,012,804 B1
(45) Date of Patent: Sep. 6, 2011

(54) METHOD AND SYSTEM FOR MOUNTING LASERS ON ENERGY ASSISTED MAGNETIC RECORDING HEADS

(75) Inventors: Lei Wang, Fremont, CA (US); Shing Lee, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 12/645,493

(22) Filed: Dec. 23, 2009

(51) Int. Cl.
*H01L 21/00* (2006.01)
(52) U.S. Cl. .......................... 438/110; 438/113
(58) Field of Classification Search .......... None
See application file for complete search history.

(56) References Cited

U.S. PATENT DOCUMENTS

| 6,455,398 | B1 | 9/2002 | Fonstad, Jr. et al. |
| 7,203,387 | B2 | 4/2007 | Doan |

*Primary Examiner* — Scott B Geyer

(57) ABSTRACT

A method and system for providing energy assisted magnetic recording (EAMR) heads including EAMR transducers are described. The method and system include aligning a laser bar to the EAMR heads on a substrate. The laser bar includes lasers in locations corresponding to a portion of the EAMR transducers. The method and system also include bonding the laser bar to the substrate and removing a portion of the laser bar to separate the plurality of lasers. The substrate is separated into the EAMR heads.

18 Claims, 9 Drawing Sheets

Front View

Side View

Dicing Direction
Front View

Dicing Direction
Side View

Dicing Direction
Side View

Dicing Direction
Side View

Dicing Direction
Front View

Dicing Direction
Side View

Front View

Side View

Side View

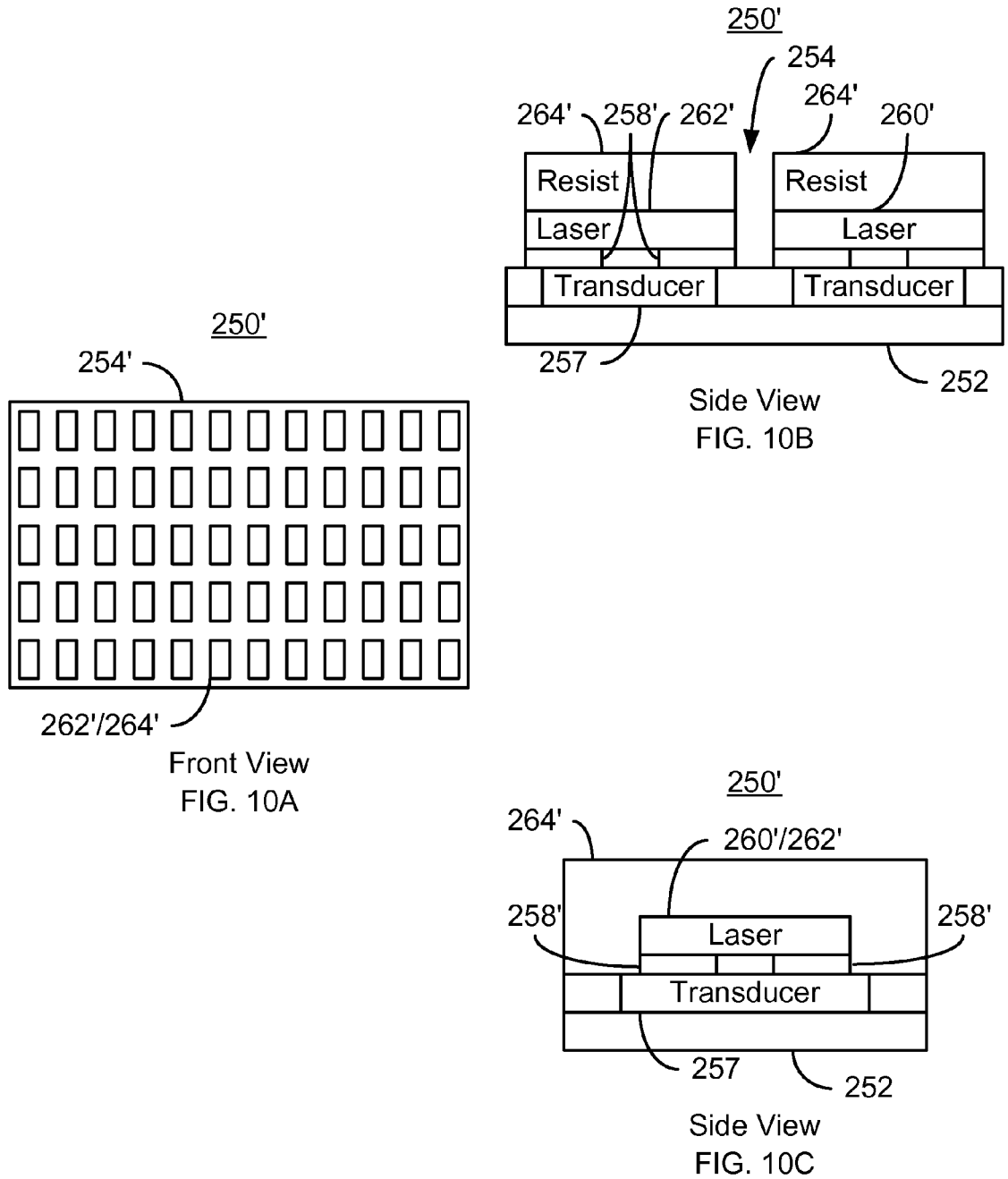

METHOD AND SYSTEM FOR MOUNTING LASERS ON ENERGY ASSISTED MAGNETIC RECORDING HEADS

BACKGROUND

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. Other components that may be part of the conventional EAMR disk drive 10 are not shown. The conventional slider 20 is typically attached to the suspension at its back side 24. A conventional EAMR transducer 28 is coupled with the slider 20.

The laser diode 30 is coupled in proximity to the EAMR transducer 22 on the trailing edge 26 of the slider 20. Light from the conventional laser diode 30 is provided substantially along the optic axis 32 of the conventional laser diode 30 to the trailing edge 26 of the slider 20. More specifically, light from the laser diode 30 is provided to a grating (not shown) of conventional EAMR transducer 22. The light from the laser diode 30 coupled into the grating is then provided to a waveguide (not shown). The waveguide directs the light toward the conventional media 12, heating a small region of the conventional media 12. The conventional EAMR transducer 22 magnetically writes to the conventional media 12 in the region the conventional media 12 is heated.

FIG. 2 depicts a conventional method 50 for fabricating a portion of the conventional EAMR disk drive 10. For simplicity, only a portion of the method 50 is described. The conventional EAMR transducer 28 is fabricated on a conventional substrate, such as an AlTiC substrate, via step 52. Typically, a reader for the conventional disk drive 10 has already been fabricated. Thus, the conventional EAMR transducer 28 is built on other structures. Typically, multiple transducers are fabricated in parallel on the same substrate.

Once fabrication of the conventional EAMR transducer 28 is completed, the laser diode 30 may be mounted in proximity to the conventional EAMR transducer 28, via step 54. More specifically, the laser diode 30 is mounted in proximity to the trailing surface 26 of the slider 20. The EAMR heads may then be separated, via step 56. For example, the substrate holding the EAMR transducers 28 may be cleaved or otherwise cut into individual sliders 20. The front side of the substrate, on which the EAMR transducer 28 is fabricated, becomes the trailing edge 26 of the slider 20. In other conventional methods, the EAMR heads are separated prior to the laser diode 30 being mounted. However, in both cases, the laser diode is mounted in proximity to the EAMR transducer 28. The fabrication of the conventional drive 10 may then be completed. For example, the conventional EAMR head including the conventional slider 20 and conventional EAMR transducer 28 may be mounted on a flexure and then in a disk drive.

Although the conventional EAMR disk drive 10 and method 50 may function, improvements are desired. More specifically, aligning the laser 30 to the desired position with respect to the conventional transducer 28 is time consuming and prone to error. Further, the throughput and yield of a manufacturing for fabricating the conventional EAMR disk drive 10 may be adversely affected. Other conventional methods have proposed using a coupling mechanism, such as an optical fiber (not shown) to transmit light from the laser 30 to the conventional transducer 28. However, such methods have analogous drawbacks.

Accordingly, what is needed are improved methods and systems for fabricating EAMR disk drives.

BRIEF SUMMARY OF THE INVENTION

A method and system for providing energy assisted magnetic recording (EAMR) heads including EAMR transducers are described. The method and system include aligning a laser bar to the EAMR heads on a substrate. The laser bar includes lasers in locations corresponding to a portion of the EAMR transducers. The method and system also include bonding the laser bar to the substrate and removing a portion of the laser bar to separate the plurality of lasers. The substrate is separated into the EAMR heads.

BRIEF DESCRIPTION OF THE DRAWINGS

FIGS. 6A, 6B, 7A, 7B, 7C, 8A, 8B, 8C, 9A, 9B, 9C, 10A, 10B, 10C, and 11 are diagrams depicting an exemplary embodiment of EAMR heads during fabrication.

DETAILED DESCRIPTION OF THE EMBODIMENTS OF THE INVENTION

Figure 1:
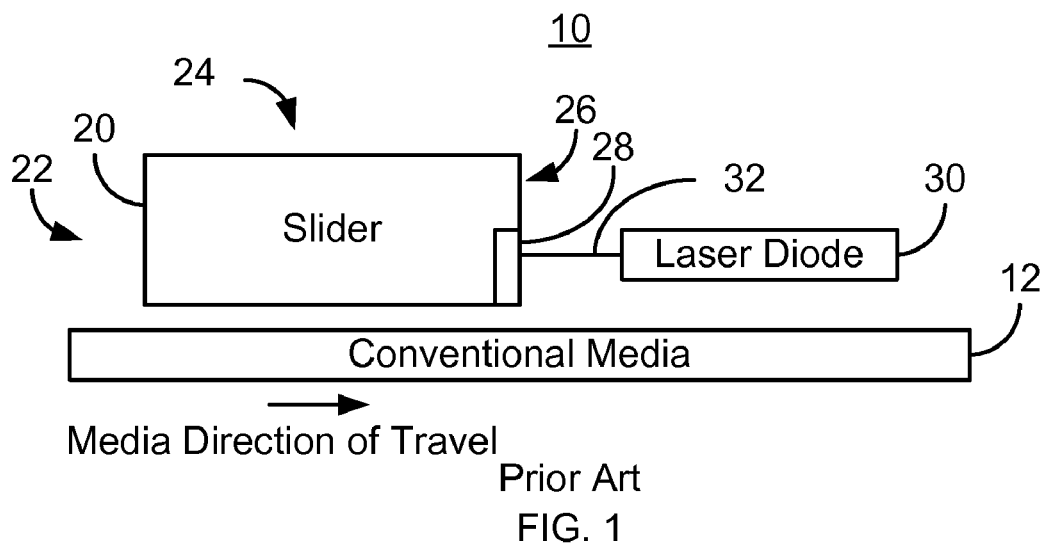
FIG. 1 is a diagram depicting a portion of a conventional energy assisted magnetic recording disk drive.
Figure 2:
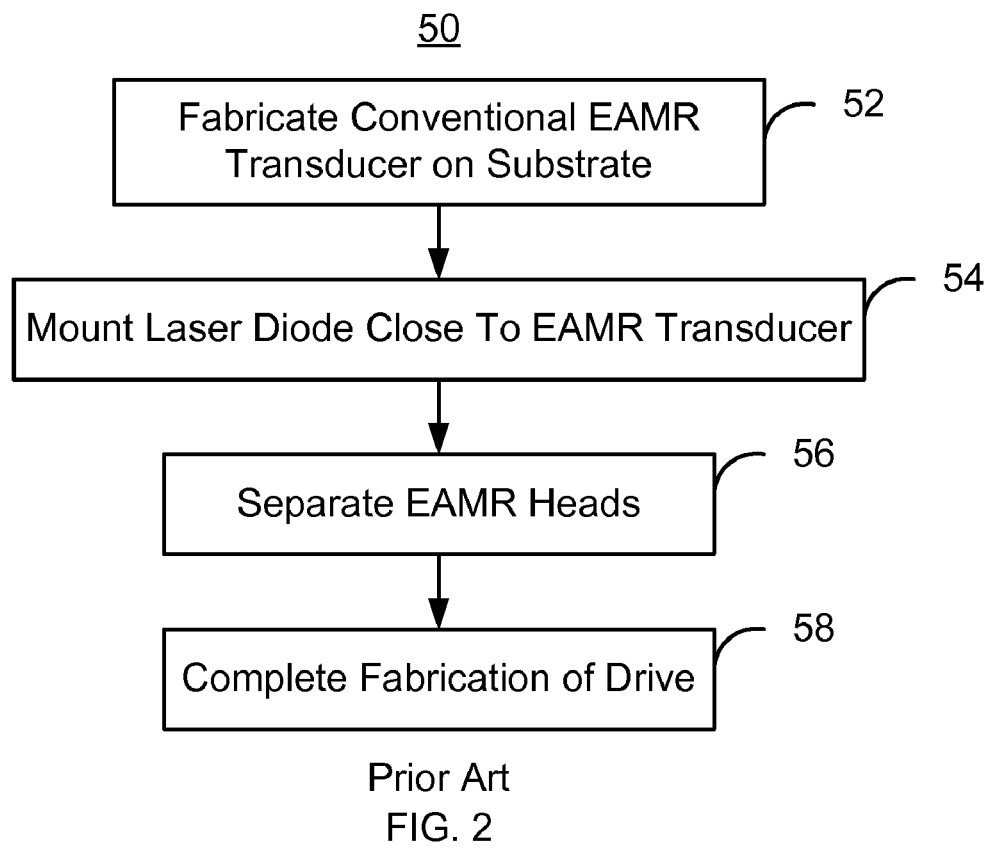
FIG. 2 is a flow chart depicting a conventional method for fabricating a conventional EAMR disk drive.
Figure 3:
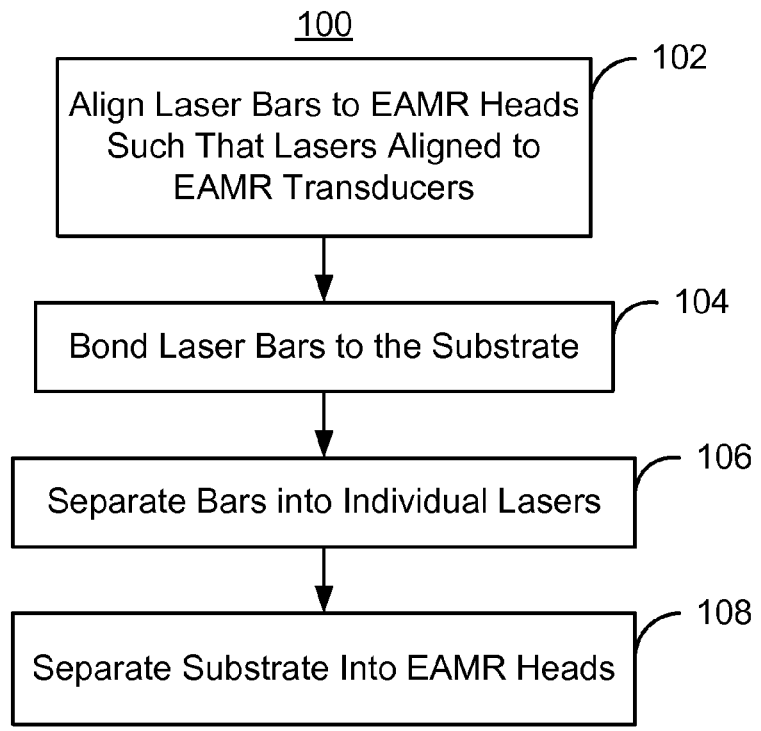
FIG. 3 is a flow chart depicting an exemplary embodiment of a method for fabricating an EAMR head.

FIG. 3 is a flow chart depicting an exemplary embodiment of a method 100 for fabricating EAMR heads. Although certain steps are shown, some steps may be omitted, interleaved, performed in another order, and/or combined. The EAMR heads being fabricated may be part of merged heads, each of which includes an EAMR write transducer, a read transducer (not shown) and resides on a slider. Further, the EAMR heads are fabricated on a substrate which, when separated into the individual EAMR heads, corresponds to the slider. The method 100 commences after the EAMR transducers have been fabricated on the substrate.

Laser bars are aligned to the EAMR heads, via step 102. Each laser bar includes multiple lasers. However, there is no requirement that all of the laser bars have the same number of lasers. The number of lasers in a particular bar may vary and depend upon the specific processing and tolerances used. For example, a laser bar might include five, ten, twenty, forty, fifty, one hundred or another number of lasers. For a particular substrate containing a number of heads, multiple laser bars may be used in order to provide a sufficient number of lasers for all of the heads desired to be fabricated. In some embodiments, the lasers within the laser bar are edge emitting lasers. The laser bars may be provided from a wafer including a plurality of laser bars. For example, laser diodes may be fabricated on a wafer in an array. The wafer may then be cleaved into bars. Each laser bar so formed includes edges, a top side, and a bottom side. Further, the laser bars may include metallization on the bottom side of the laser bars. The metallization allows for electrical and, in some embodiments, mechanical contact to be made to the lasers within the bars.

Thus, it is the bottom side of the laser bars that will be bonded to the devices. However, laser bars used in the method 100 may be fabricated in another manner. Further, there is no requirement that laser bars used in the method 100 all be from the same wafer.

Step 102 aligns the lasers within each bar to the EAMR transducers of the corresponding EAMR heads. Step 102 may include individually aligning laser bars to a portion of the EAMR heads, until laser bars for all or a desired fraction of the EAMR heads have been aligned. In some embodiments, at least some of the laser bars are passively aligned. In such embodiments, the laser bars may be aligned to alignment marks on the surface of the substrate. For example, the alignment marks may be fabricated on the substrate, on the EAMR transducer, or on another layer. In other embodiments, at least some of the laser bars may be actively aligned. Active alignment includes using light from at least some of the lasers in the laser bars. For example, lasers at the end(s) of the laser bars may emit light. Optical detectors reside at locations that correspond to the desired alignment of the laser bars. During alignment, signals from these optical detectors are monitored. When the signal detected by particular detector(s) is maximized or above a particular threshold, it can be concluded that the laser bar corresponding to the detectors is aligned. Further, a combination of active and passive alignment may be used. In some embodiments, bar may be passively aligned to ensure that the laser bar is close to the desired alignment. For example, the laser bar may be passively aligned until the lasers within the bar used for alignment (alignment lasers) are close to locations in which their light is received by the optical detectors described above. Alignment of the laser bar may then be completed using the active alignment described above.

The laser bars are bonded to the substrate, via step 104. In some embodiments, step 104 includes performing a low-temperature bonding at a temperature of not more than two hundred and fifty degrees Celsius. In some such embodiments, the temperature of the low-temperature bonding does not exceed two hundred degrees Celsius.

A portion of each of the laser bars is removed, separating the laser bars into the individual lasers, via step 106. The laser bars may be separated in a number of ways. For example, the laser bar may be diced. In some such embodiments, the laser bars are covered with photoresist before dicing. The dicing may then be performed, for example using a laser or through mechanical dicing. In other embodiments, lasers may be separated from the laser bars by etching through the laser bar. For example, a mask may be provided on the substrate. Apertures in the mask correspond to the portions of the laser bars to be removed. An etch is then performed to remove exposed portions of the laser bars. One or more of the above methods of separating the laser bars into the individual lasers may include thinning the laser bar prior to etching or dicing.

The substrate is also separated into individual EAMR heads, via step 108. Prior to step 108, the lasers, which have been separated from the individual lasers, may also be enclosed in a capping layer. The capping layer has a laser-facing surface that is in proximity to the laser and a trailing surface opposite to the laser-facing surface. The laser-facing surface includes a laser cavity therein. The laser cavity is configured such that the laser fits within the cavity. Thus, the laser cavity encloses the laser between the overcoat layer and the capping layer. Separating the EAMR heads may include dicing the substrate.

Figure 4:
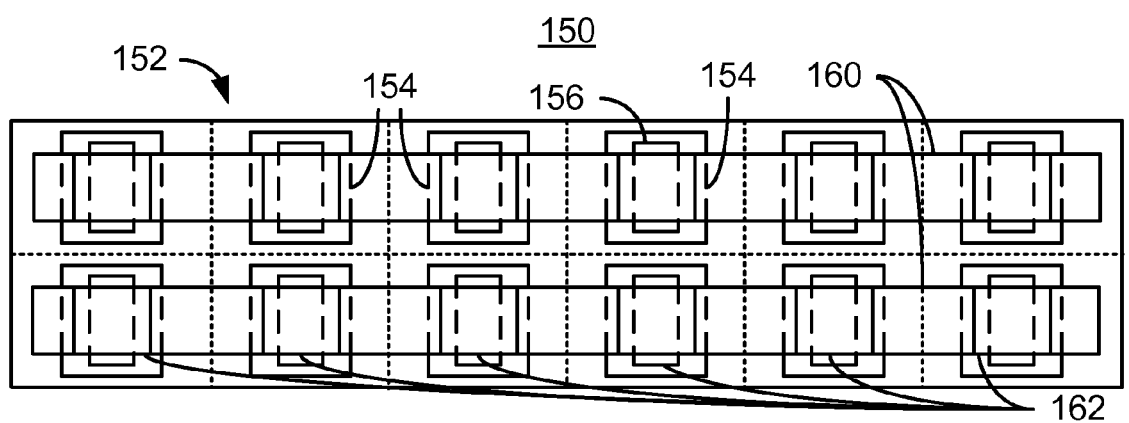
FIG. 4 is a diagram depicting an exemplary embodiment of EAMR heads during fabrication.

FIG. 4 is a diagram depicting an exemplary embodiment of a portion of an array of EAMR heads 150 during fabrication using the method 100. For clarity, FIG. 4 is not to scale. The array of EAMR heads 150 is formed on a substrate 152. For simplicity, only two rows of devices are shown. However, the substrate 152 generally includes a much larger number of heads. Individual EAMR heads 154 are shown on the slider 152. For clarity, only some EAMR heads 154 are labeled. Each EAMR head 154 includes an EAMR transducer 156. Portions of the EAMR head 154 and EAMR transducer 156 residing under other components are shown by dashed lines. Lasers 162 within the laser bars 160 have been aligned to the corresponding EAMR heads 154 and EAMR transducers 156 and bonded to the substrate 152. Regions where the laser bars 160 and substrate 152 are to be diced or otherwise separated are indicated by dotted lines. In the embodiment shown, the lasers 162 would emit light from the top edge as viewed in FIG. 4. Consequently, the ABS corresponds to the right edge of the heads 154. Thus, individual EAMR heads 154 may be formed.

Using the method 100, the EAMR heads 150 may be fabricated. Multiple lasers 162 may be affixed to the substrate 152 at a time, by aligning and affixing the laser bars 160. Because many lasers 162 are aligned via the laser bars 160, a higher throughput may be achieved. Further, improved alignment accuracy may be provided, particularly if active alignment of the laser bars is performed. More specifically, individual lasers 162 in a laser bar 160 are located using photolithography. The alignment accuracy of photolithography is generally better than the accuracy achieved using passive or active alignment. Thus, once the laser bar 160 is aligned, all of the lasers 162 within the bar may have improved alignment. Moreover, the lasers 162 may be better protected as they may be enclosed in a cavity of the capping layer. Finally, three dimensional wafer packaging may be used to integrate the EAMR heads 154. Consequently, manufacturing throughput and yield may be improved. In addition, the laser bar 160 facets from which light is emitted can be prepared using conventional reliable laser fabrication techniques such as cleaving and coating. Consequently, the individual lasers 162 may have improved performance and reliability.

Figure 5:
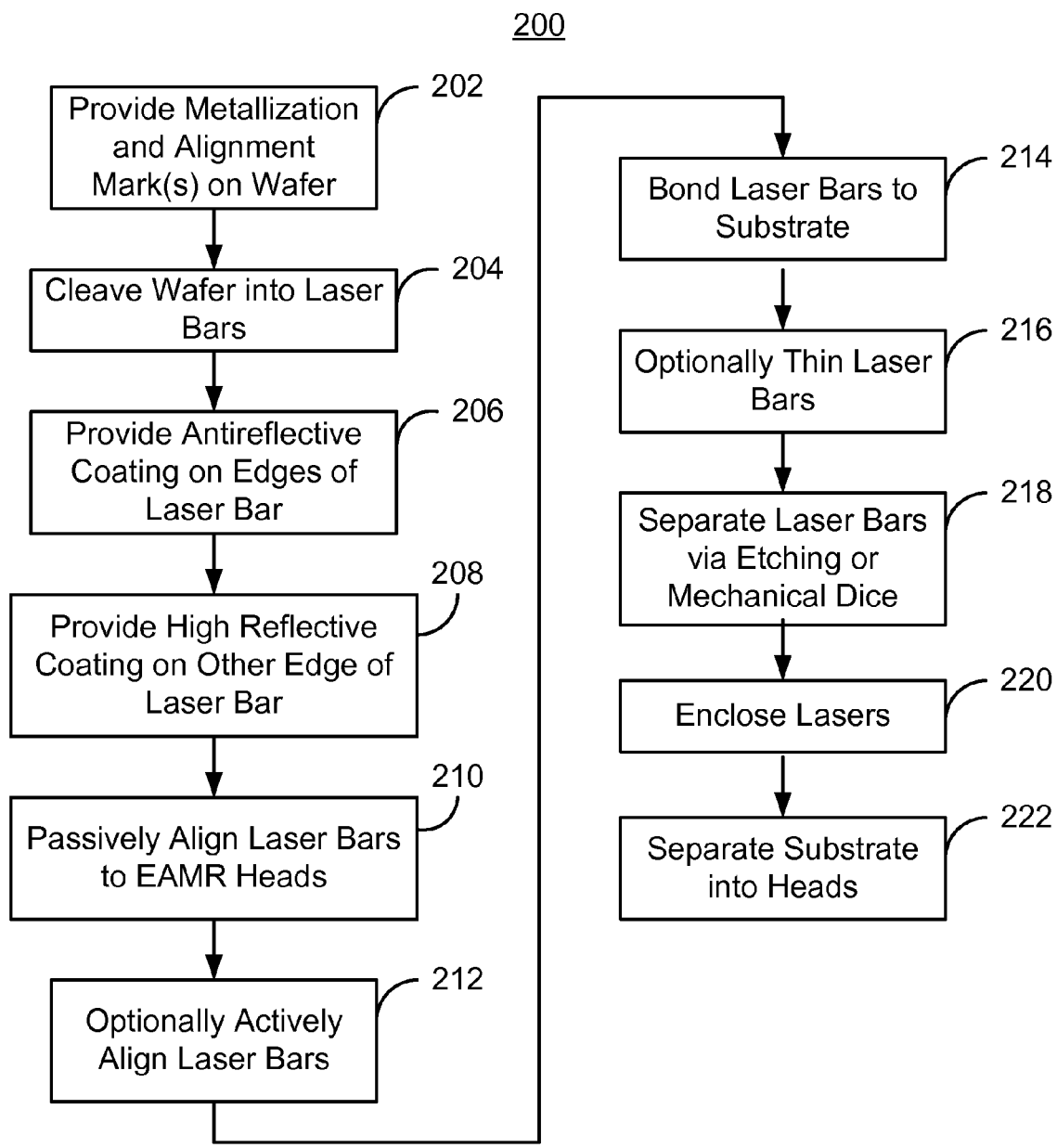
FIG. 5 is a flow chart depicting another exemplary embodiment of a method for fabricating EAMR heads.

FIG. 5 is a flow chart depicting another exemplary embodiment of a method 200 for fabricating an EAMR head. FIGS. 6A, 6B, 7A, 7B, 7C, 8A, 8B, 8C, 9A, 9B, 9C, 10A, 10B, 10C and 11 are diagrams depicting views of an array of EAMR heads 250 during fabrication. For clarity, FIGS. 6A, 6B, 7A, 7B, 7C, 8A, 8B, 8C, 9A, 9B, 9C, 10A, 10B, 10C, and 11 are not to scale. Further, for simplicity, not all components are labeled in FIGS. 6A, 6B, 7A, 7B, 7C, 8A, 8B, 8C, 9A, 9B, 9C, 10A, 10B, 10C, and 11. Referring to FIGS. 5, 6A, 6B, 7A, 7B, 7C, 8A, 8B, 8C, 9A, 9B, 9C, 10A, 10B, 10C, and 11, the method 200 is described in the context of the substrate, EAMR transducer, and other components shown. However, the method 200 may be used to form another device (not shown). The array of EAMR heads 250 being fabricated may be part of a merged head that also includes a read head (not shown in FIGS. 6A, 6B, 7A, 7B, 7C, 8A, 8B, 8C, 9A, 9B, 9C, 10A, 10B, 10C, and 11) and resides on a slider of a disk drive.

Laser bars are provided in steps 202-208. More specifically, metallization and alignment marks are provided on a wafer in which multiple lasers are formed, via step 202. The lasers may be edge emitting laser diodes. The metallization is provided on the bottom the wafer and is to be used to connect to the lasers. The wafer including the lasers is cleaved into multiple laser bars, via step 204. The laser bars may or may not extend across the entire wafer. Stated differently, the laser bars may include a variable number of lasers and may have a varying length. The length and number of lasers in a particular bar may depend upon a variety of factors, such as the variations in how flat the laser bar is as well as how flat the substrate on which the EAMR heads are formed is.

An antireflective coating (ARC) is provided on at least one of the edges of each of the laser bars, via step 204. Conversely, a high reflective coating (HRC) is provided on another of the edges of each laser bar, via step 206. In some embodiments, the ARC is provided on one edge of each laser bar, while the HRC is provided on the remaining edge. The lasers in a laser bar may thus emit light on the edge having the ARC. Thus, the laser bars have been fabricated. Some or all of the laser bars so fabricated may be used in forming the EAMR heads in the method 200.

Figure 6A:
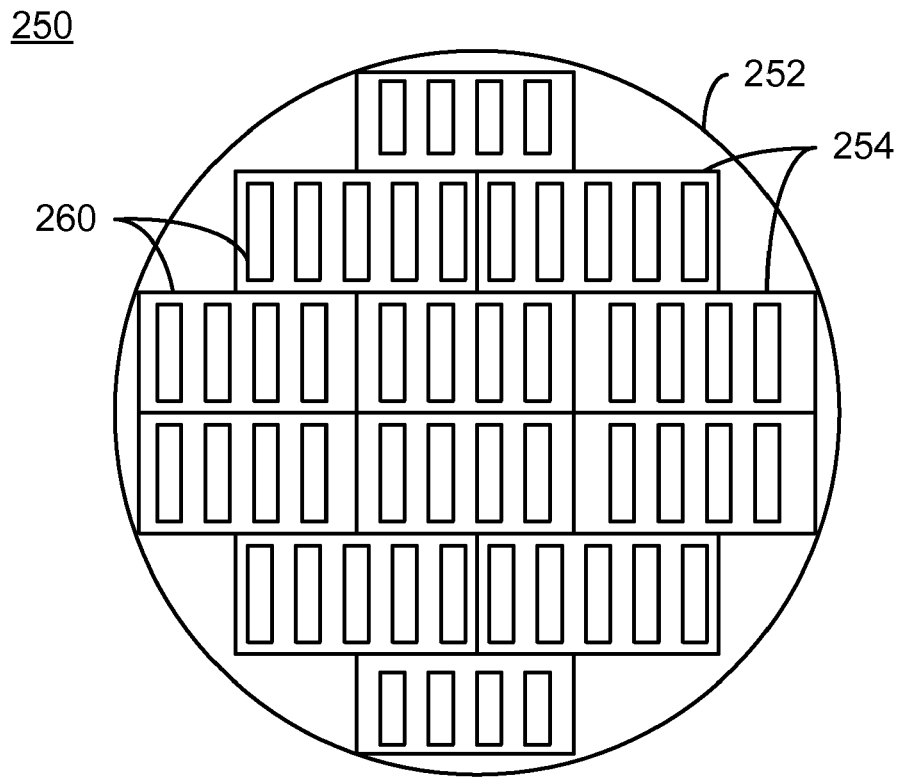
Figure 6B:
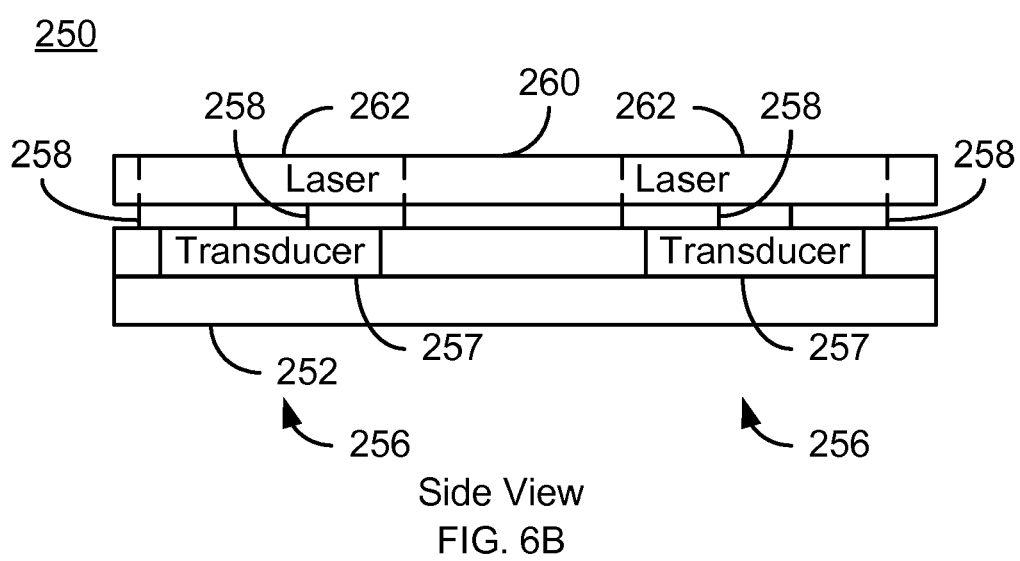

Each of the laser bars is passively aligned to a portion of the EAMR heads, via step 210. Step 210 includes aligning the laser bars to alignment marks on a substrate including the EAMR transducers. Thus, the lasers are aligned to locations corresponding to a portion of the EAMR transducers. The laser bars may also optionally be actively aligned, via step 212. Thus, the laser bars are aligned to the desired location. FIGS. 6A and 6B depict front and side view of an array of EAMR heads 250 on a substrate 252, such as an AlTiC substrate. The array 250 includes sectors 254. Each sector 254 includes a number of EAMR transducers 257 corresponding to EAMR heads 256 being fabricated. Each EAMR head 256 includes at least one EAMR transducer 257. Other components (not shown) may be part of the EAMR heads 256. Also shown are laser bars 260 that have been placed in each sector 254. Each laser bar 260 includes multiple lasers 262. Further, the laser bars 260 have been placed so that the metallization (not shown) for the lasers is in contact with bond pads 258 on the substrate 252. Although a particular number of laser bars 260 per sector are shown, another number of laser bars 260 might be used. In addition, although a particular number of heads per sector 254 and per laser bar 260 are shown, another number might be used.

The laser bars 260 are bonded to the substrate, via step 214. In some embodiments, this bonding may be achieved in a low temperature process, utilizing maximum temperatures not exceeding two hundred fifty degrees Celsius. In some such embodiments, the maximum temperature does not exceed two hundred degrees Celsius. For example, bonding may be performed using a low temperatures process, such as an Au—In inter-diffusion process. Alternatively, low temperature solders, such as PbSn might be used in bonding the laser bars 260.

Figure 7A:
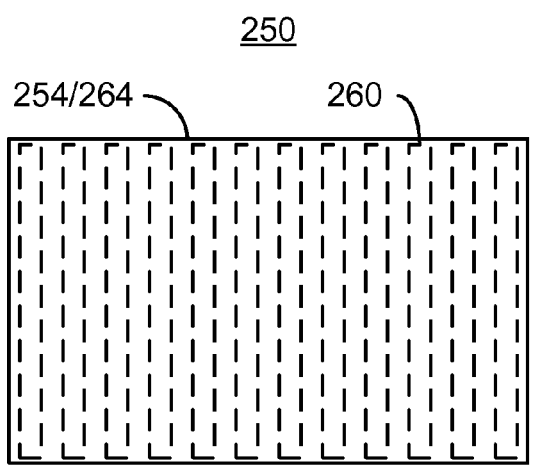
Figure 7B:
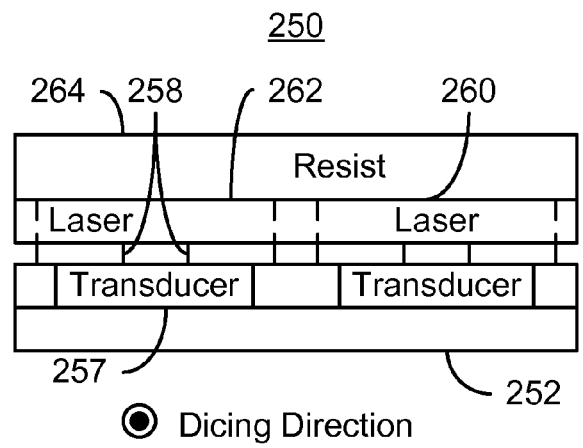
Figure 7C:
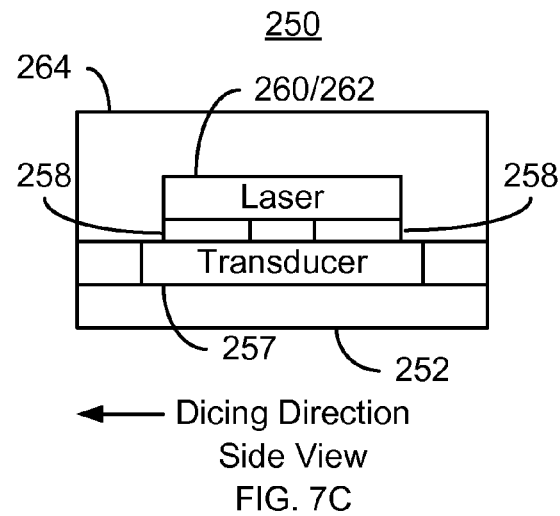
Figure 8B:
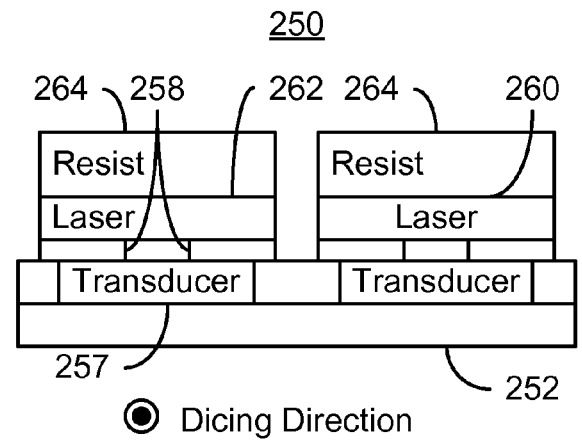
Figure 8A:
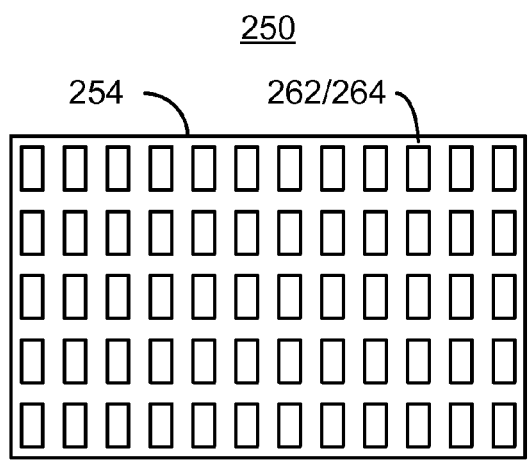
Figure 8C:
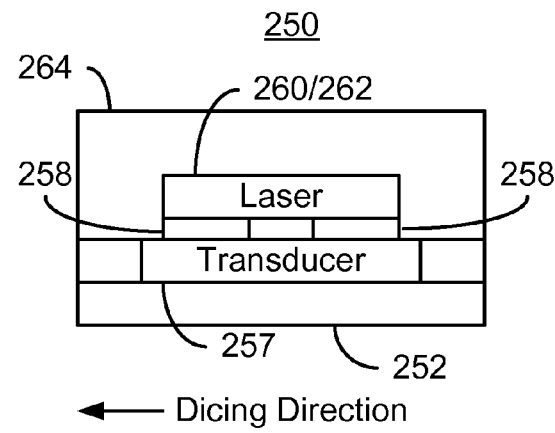
Figure 9A:
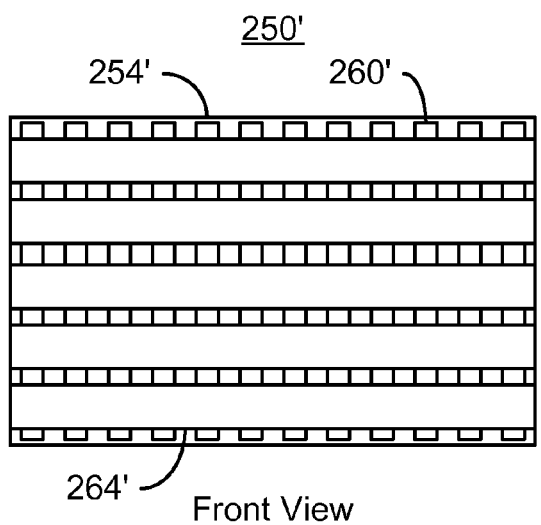
Figure 9B:
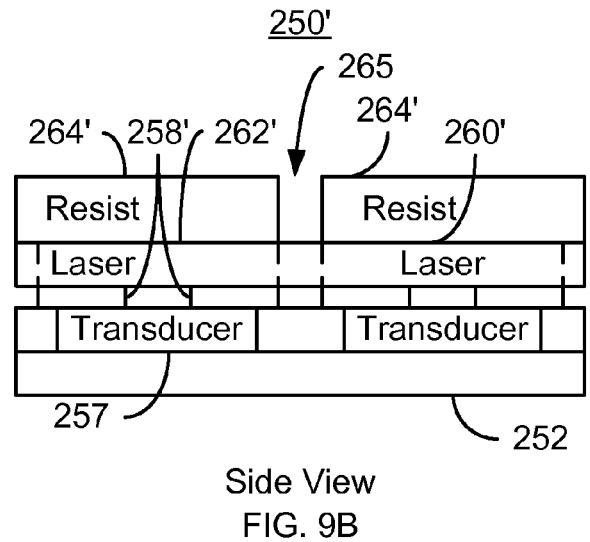
Figure 9C:
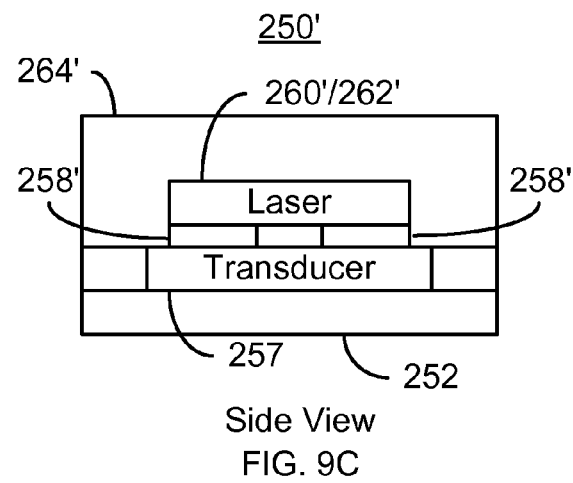

The laser bars may be optionally thinned, via step 216. Step 216 facilitates the following step 218. The individual lasers 262 are separated from the laser bars 260, via step 218. This may be accomplished in a number of ways. For example, the laser bars may be mechanically diced or etched. FIGS. 7A, 7B, 7C, 8A, 8B, and 8C depict the array 250 in which dicing is performed. FIGS. 7A, 7B, and 7C depict the array 250 of EAMR heads in preparation for mechanical dicing. For mechanical dicing, the sector 254 is covered in resist 264. The saw direction, termed a "dicing direction" in FIGS. 7A, 7B, and 7C is horizontal. FIGS. 8A, 8B, and 8C depict the array 250 of EAMR heads after the dicing is performed. Thus, the resist 264 and laser bars 260 have been cut. As a result, individual lasers 262 are separated. FIGS. 9A, 9B, 9C, 10A, 10B, and 10C depict the array 250' in which etching is performed. FIGS. 9A, 9B, and 9C depict the array 250' of EAMR heads in preparation for etching. Thus, a resist mask 264' has been provided. The resist mask 264' includes lines interleaved with apertures 265 that expose the underlying laser bars 260'. FIGS. 10A, 10B, and 10C depict, the array 250' after step 218 is completed. Thus, the laser bar 260 has been etched through, leaving individual lasers 264'. A wet etch using etchants such as citric acid, sulfuric acid, and/or ammonia hydroxide may be performed. An ion mill or similar step may be used to clean the facet/edge of the lasers 262' through which lasing is desired. Once mechanical dicing or etching is completed, the resist 264/264' may be stripped as part of step 218.

Figure 11:
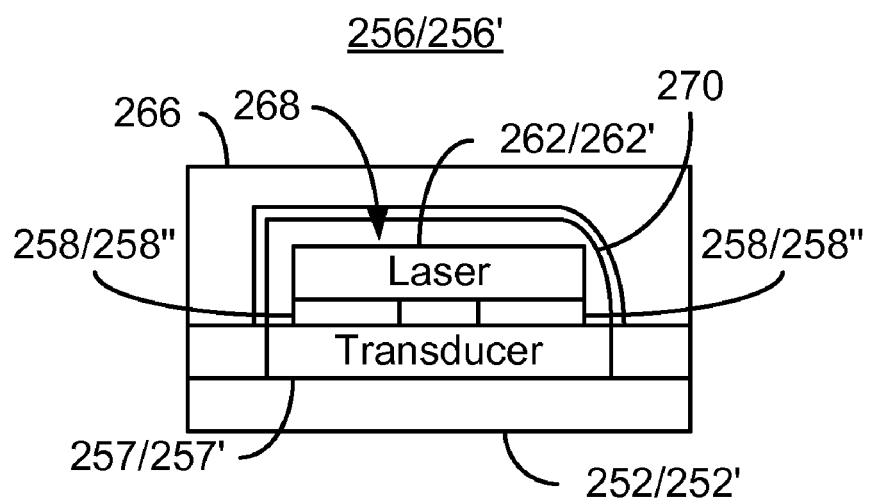

The lasers 262/262' are enclosed, via step 220. In some embodiments, the lasers 262/262' are enclosed in a capping layer. The capping layer may be a molded material. The capping layer includes a laser-facing surface having a laser cavity therein. The laser cavity is configured to fit the laser 262/262'. In some embodiments, the laser cavity has a reflective, parabolic portion that is aligned with the edge of the laser 262/262' that emits light. The substrate 252/252' is separated into the EAMR heads 256/256, via step 222. FIG. 11 depicts an EAMR head 256/256' formed using the method 200. The substrate 252/252', transducer 257/257', bond pads 258/258' and laser 262/262' are shown. Also shown is capping layer 266. The capping layer 266 includes a laser cavity 268 having a reflective surface 270. The laser cavity 268 is configured such that the laser 262/262' fits therein. The reflective surface 270, particularly the curved portion, may reflect and collimate light. Further, the curved portion of the reflective surface 270 may face the edge of the laser 262/262' that emits light.

Using the method 200, EAMR heads, such as the EAMR head 256/256' may be fabricated. The method 200 and EAMR head 250 share the benefits of the method 100 and EAMR head 150. Higher manufacturing throughput and improved yield may be obtained. Further, performance and reliability may also be improved.

We claim:

1. A method for providing a plurality of energy assisted magnetic recording (EAMR) heads including a plurality of EAMR transducers, the method comprising:
   aligning a laser bar to the plurality of EAMR heads on a substrate, the laser bar including a plurality of lasers in locations corresponding to a portion of the plurality of EAMR transducers;
   bonding the laser bar to the substrate;
   removing a portion of the laser bar to separate the plurality of lasers;
   separating the substrate into the plurality of EAMR heads.

2. The method of claim 1 further comprising:
   enclosing each of the plurality of lasers.

3. The method of claim 2 wherein the enclosing further includes:
   bonding a capping layer to the substrate, the capping layer having a laser-facing surface including a plurality of laser cavities therein, the plurality of laser cavities enclosing the plurality of lasers.

4. The method of claim 1 wherein the removing the portion of the laser bar further includes:
   dicing the laser bar.

5. The method of claim 4 wherein the removing the portion of the laser bar further includes:
   covering the plurality of laser bars with photoresist before the dicing.

6. The method of claim 5 wherein the dicing further includes:
   performing laser dicing.

7. The method of claim 5 wherein the dicing further includes:
   performing mechanical dicing.

8. The method of claim 1 wherein the removing the portion of the laser bar further includes:
   providing a mask including a plurality of lines separated by a plurality of apertures, the plurality of apertures exposing the portion of the laser bar; and etching the portion of the laser bar.

9. The method of claim 1 wherein the removing the portion of the laser bar further includes:

thinning the laser bar.

10. The method of claim 1 further comprising:

providing the laser bar from a wafer including a plurality of laser bars.

11. The method of claim 10 wherein the providing the laser bar further includes:

cleaving the wafer to provide the laser bar, the laser bar including a plurality of edges, a top side, and a bottom side;

providing an antireflective coating on at least one of the plurality of edges;

providing a high reflective coating on another of the plurality of edges; and providing metallization on the bottom side of the laser bar, the bottom side being bonded to the substrate.

12. The method of claim 1 wherein the plurality of lasers are edge emitting lasers.

13. The method of claim 1 wherein the bonding the laser bar further includes:

performing a low-temperature bonding at a temperature of not more than 250 degrees Celsius.

14. The method of claim 13 wherein the temperature is not more than 200 degrees Celsius.

15. The method of claim 1 wherein the aligning further includes:

actively aligning the laser bar.

16. The method of claim 1 wherein the aligning further includes:

passively aligning the laser bar.

17. A method for providing a plurality of energy assisted magnetic recording (EAMR) heads comprising:

providing metallization and at least one alignment mark on a wafer including a plurality of plurality of laser bars, each of the plurality of laser bars including a plurality of lasers, a plurality of edges, a top side, and a bottom side, the metallization and at least one alignment mark residing on the bottom side;

cleaving a wafer to provide the plurality of laser bars providing an antireflective coating on at least one of the plurality of edges of each of the plurality of laser bars;

providing a high reflective coating on at least another of the plurality of edges of each of the plurality of laser bars;

passively aligning each of the plurality of laser bars to a portion of the plurality of EAMR heads on a substrate using the alignment marks, the plurality of lasers in locations corresponding to a portion of the plurality of EAMR transducers;

bonding the bottom of each of the plurality of laser bars to the substrate;

thinning the plurality of laser bars;

removing a portion of the each of the plurality of laser bars to separate the plurality of lasers using at least one of dicing and etching through the plurality of laser bars;

enclosing each of the plurality of lasers; and separating the substrate into the plurality of EAMR heads.

18. The method of claim 17 further comprising:

actively aligning after the laser bars.

* * * * *